United States Patent

[11] 3,631,712

[72] Inventor Julian J. Mercier
11302 East 4th Ave., Spokane, Wash. 99206
[21] Appl. No. 13,551
[22] Filed Feb. 24, 1970
[45] Patented Jan. 4, 1972

[54] METHOD AND APPARATUS FOR DETERMINING SLUMP IN CONCRETE
7 Claims, 11 Drawing Figs.
[52] U.S. Cl. ................................................ 73/54, 73/433
[51] Int. Cl. .......................................... G01n 11/00
[50] Field of Search ........................................ 73/54, 433, 435, 436

[56] References Cited
UNITED STATES PATENTS
2,013,837 9/1935 Perry ............................ 73/54 X
2,630,706 3/1953 Maxon, Jr. .................... 73/54
1,983,197 12/1934 Stamp ........................... 73/54
2,247,553 7/1941 Hutchinson ................... 73/54
2,409,014 10/1946 Bohmer et al. ................ 73/54

Primary Examiner—Louis R. Prince
Assistant Examiner—Joseph W. Roskos
Attorney—John W. Kraft ABSTRACT: The method involves the steps of emersing in a semiplastic concrete mass a rectangular sample cage having two opposing vertical upstanding open sides mounted on a strain gauge, having indicia thereon correlated with the known slump of comparable materials as obtained from the method of rodding concrete in a cone, withdrawing the sample cage vertically upward out of the mass, permitting the semiplastic concrete material in the sample cage to stabilize to a position of natural repose, and weighing the mass. The apparatus comprises a sample cage of the character described to a commonly known strain gauge, which apparatus including a locking mechanism may be mounted in a commonly known mixing drum.

PATENTED JAN 4 1972 3,631,712

JULIAN J. MERCIER INVENTOR.

BY John W. Kraft

JULIAN J. MERCIER INVENTOR

JULIAN J. MERCIER INVENTOR

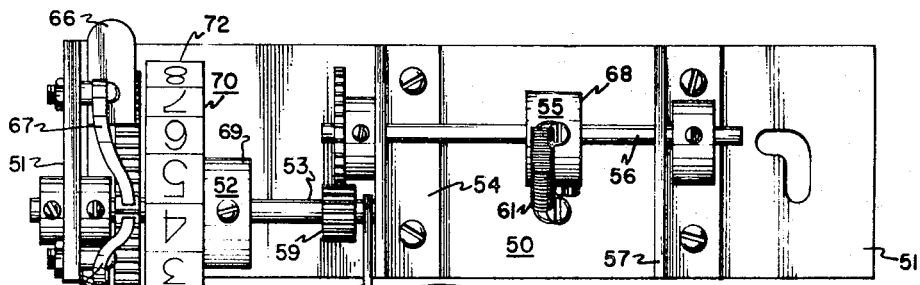
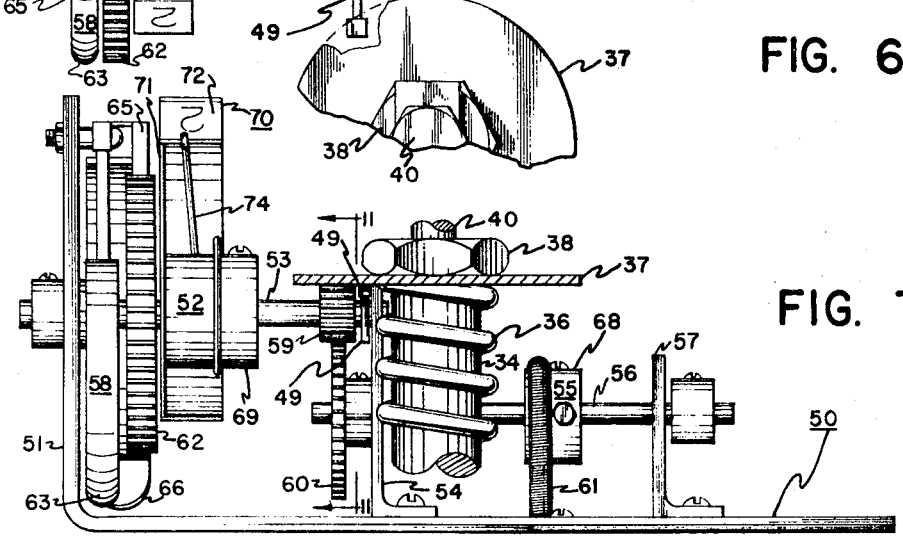
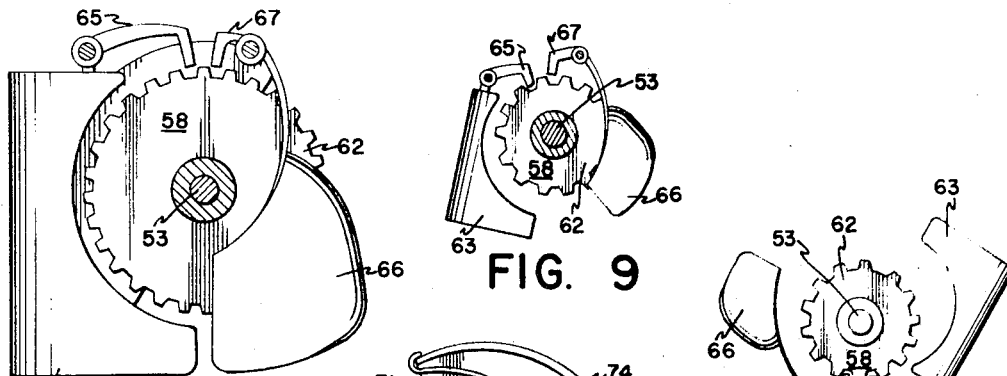
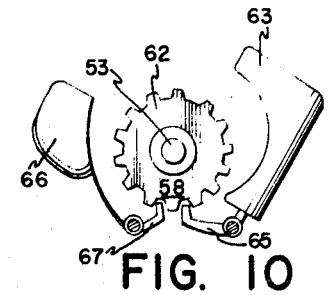
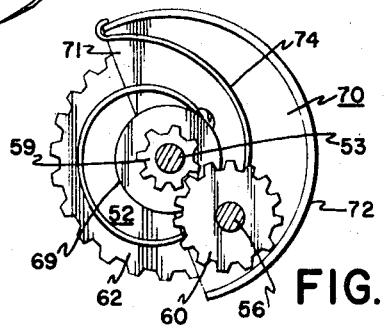
JULIAN J. MERCIER, INVENTOR

METHOD AND APPARATUS FOR DETERMINING SLUMP IN CONCRETE

FIELD OF INVENTION

The present invention relates to the method and apparatus for determining the slump in concrete and more particularly in method and apparatus for determining the slump in concrete by weighing the concrete mass at a point in time when the mass has stabilized at its point of natural repose.

DESCRIPTION OF THE PRIOR ART

The workability of concrete in the prior art can generally be predicted by determining the slump of the semiplastic concrete material mass by the commonly known method of placing a quantity of the material into a cone of a given size, rodding the material in the cone a given number of times, removing the cone from the mass and measuring the difference between the height of the cone and the height of the mass when it assumes a position of natural repose, which measurement is called slump. Workability is a word of art used by engineers and craftsmen to characterize the manner in which a given mass of concrete may be finished as well as the predictability of its strength and quality when cured to a solid state.

The method of determining slump heretofore known requires much time to determine, and the characteristics of the mass from which the sample tested is taken tends to change while the test is being made. Changes or corrections made to the mass may not be effective to produce the desired workability.

Accordingly it is an object of the present invention to provide a method of determining slump of semiplastic concrete material substantially instantaneously, and to provide means by which successive determinations of slump may be made substantially continuously.

A further object of the this invention is to provide means by which the slump of semiplastic concrete material may be determined during the mixing process.

Another object of the invention is to provide apparatus in a commonly known transit mixer operable to determine the slump of material in the mixer.

These and other objects shall become apparent from the description following, it being understood that the method and apparatus here disclosed may be adapted to hand mixing of concrete, fixed concrete mixers and the like with only slight modification by those skilled in the art.

SUMMARY OF INVENTION

Generally, it has been found through extensive tests that semiplastic concrete material having reached a point of stability at its position of natural repose may be weighed, and that weight may be predictably correlated with slump measurements obtained by the commonly known methods of rodding a concrete mass in a cone and measuring the slump. Although different aggregates used in concrete are of different weights concrete admixtures using the same type of aggregates will weigh approximately the same and such like admixtures may be correlated as to workability and slump. Therefore, it is necessary to correlate indicia on the slump indicator apparatus here taught with the slump of materials employing aggregates commonly used in a given geographical area or by a given contractor. That is to say that actual slump and weighed slump indicia may be correlated if a uniform weight of aggregate is used in the concrete mixture.

The apparatus here taught generally comprises a rectangular sample cage having two opposing vertical upstanding open sides, the cage being mounted on a strain gauge apparatus operable to weigh material by the downward pull of material in the sample cage. It has been found to advantage to provide a lock on the gauge mechanism in order that the slump of material may be determined only when the material has stabilized to a position or natural repose.

A more thorough and comprehensive understanding may be had from the detailed description of the preferred embodiment when read in connection with the drawings forming a part of this specification.

BRIEF DESCRIPTION OF THE DRAWINGS

FIG. 6 is a top plan view of the strain gauge assembly of this invention.

FIG. 7 is a side elevational view of the strain gauge assembly.

FIG. 8 is a side elevational view of the indicator locking assembly of the present invention showing the locking assembly in its unlocked position operable to permit the indicator assembly to function.

FIG. 9 is a side elevational view of the indicator locking assembly with one of the locking pawls in engagement with a gear operable to lock the indicator assembly.

FIG. 10 is a side elevational view of the indicator locking assembly showing both of the pawls in engagement with the gear.

FIG. 11 is a side elevational view of the indicator assembly of this invention.

DESCRIPTION OF THE PREFERRED EMBODIMENT

Figure 1:
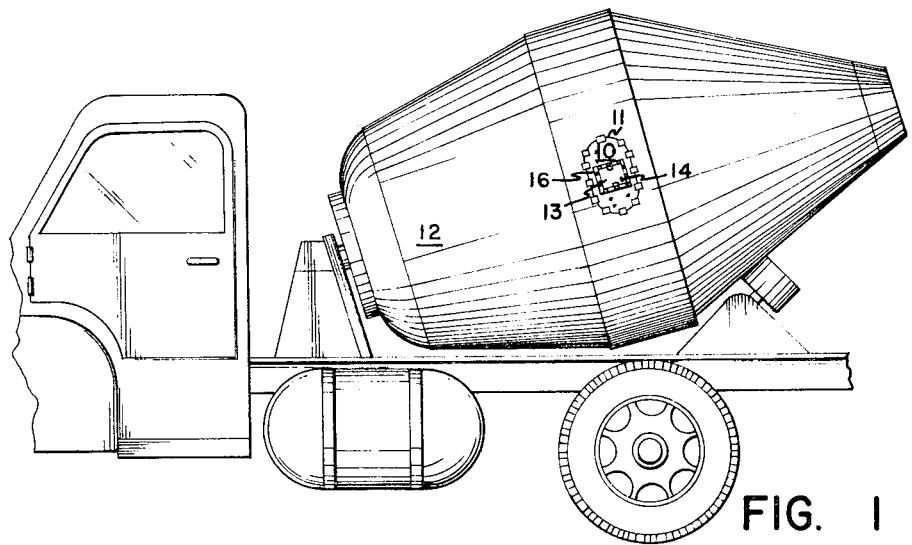
FIG. 1 is a side elevational view of the slump indicator assembly of this invention mounted in the access cover in the mixing drum of a commonly known transit mixer.

Referring now to the drawings and more particularly to the FIG. 1 which shows to advantage the slump indicator assembly of the present invention generally identified by the numeral 10 located in the access cover 11 of a commonly known transit mixer 12. While the slump indicator assembly 10 is here described for illustrative purposes in the environment of a transit mixer, it should be understood that the workability of concrete as determined by the method and apparatus taught by this invention has been accomplished in static and hand mixing environments as well.

Figure 2:
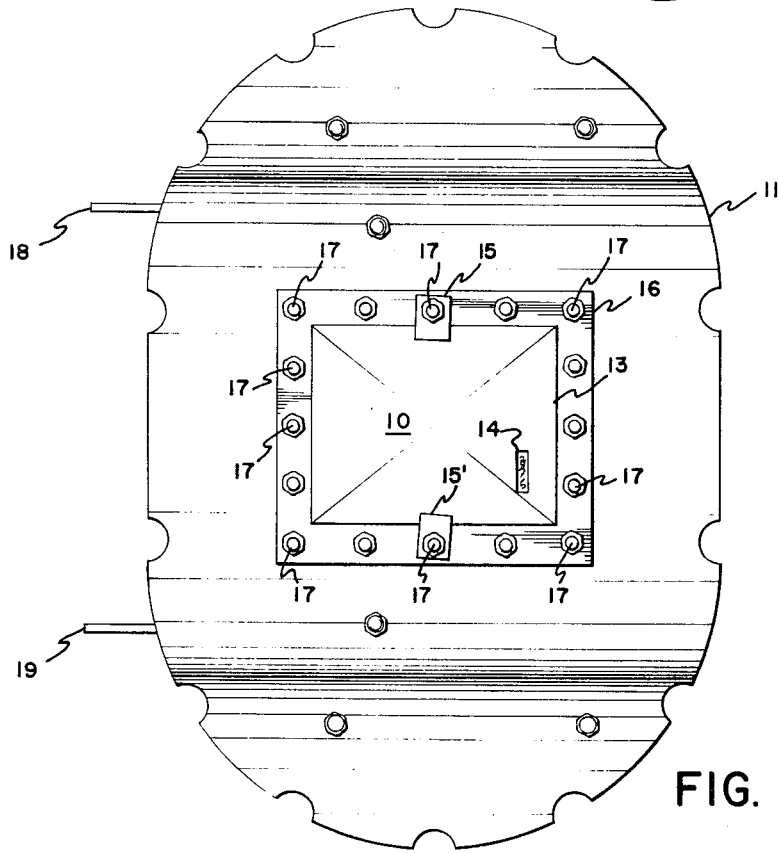
FIG. 2 is a plan view to a larger scale showing the slump indicator assembly of the present invention mounted in an access cover of a mixing drum.

The FIG. 2, drawn to a larger scale, shows the slump indicator assembly 10 mounted in the access cover 11 with the cover 11 removed from the transit mixer body. A housing plate 13 is mounted to the frame 16 by a pair of lugs 15 and 15'. The housing plate 13 includes an aperture 14 through which indicia on the indicator mechanism of the assembly 10, hereinafter later described, may be seen. The slump indicator assembly 10 is provided with a mounting frame 16 and is suitably fastened to the access cover by a multiplicity of bolts 17. The lugs 15 and 15' securing the housing plate 13 to the frame 16 and the cover 11 are provided with bolts 17 extending through the respective lugs and the frame to the access cover. A pair of rapper bars 18 and 19, hereinafter more fully described, are shown extending beyond the terminal edge of the access cover 11.

Figure 3:
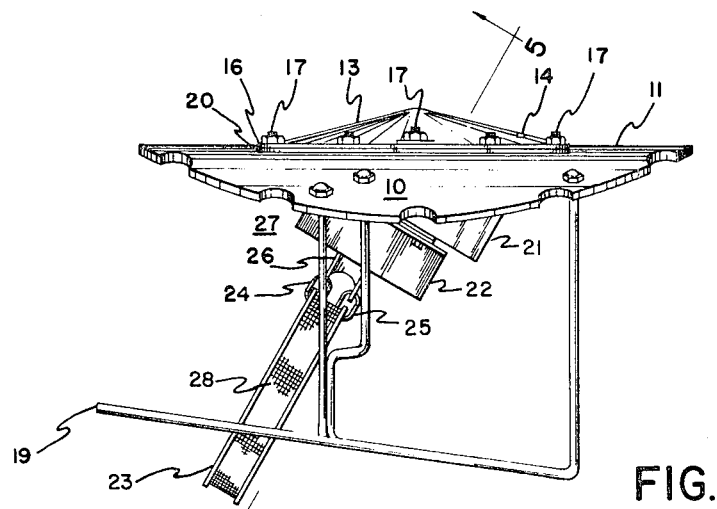
FIG. 3 is a side elevational view of the slump indicator assembly mounted in an access cover as viewed from one of the ends with respect to the mounting position of the access cover.
Figure 4:
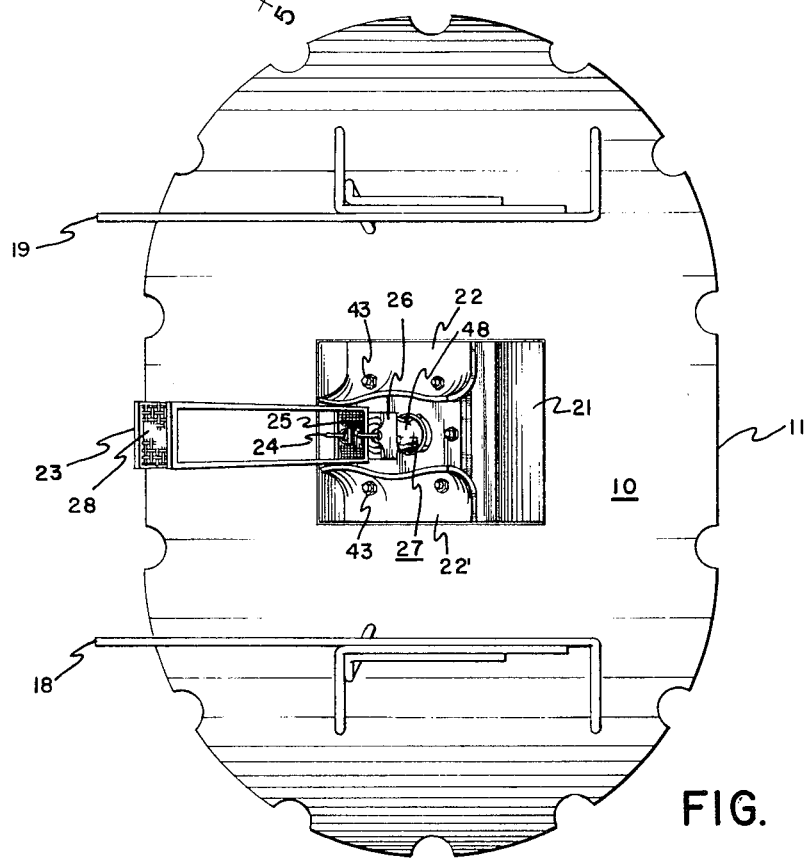
FIG. 4 is a plan view of the slump indicator assembly and access cover as viewed from the side opposite FIG. 2.

The side elevational view of FIG. 3 shows to advantage a gasket 20 disposed between the housing frame 16 and the access cover 11 operable to seal the semiplastic calcinateous material such as concrete in the mixing drum of the transit mixer 12. A housing 21 including a pair of flexible flaplike guards 22 and 22' is disposed at an angle from the frame 16. A rectangular basketlike sample cage 23 having two open opposing sides is pendantly mounted by a pair of linklike members 24 and 25 suitably fastened to the cage 23 to a yoke portion 26 on a tension post assembly 27 hereinafter later described. The sides of the cage 23 are provided with a substantially heavy mesh screen walls 28. The housing 21 and the sample cage 23 are substantially perpendicularly disposed in the mixing drum of the transit mixer when the access cover 11 with the slump indicator assembly 10 is mounted in the mixing drum. That is to say that the cage 23 is withdrawn from the semiplastic mass in the drum at right angles to the mass as the mixing drum revolves on its axes. Suffice it to say here that when the slump indicator assembly 10 of the present invention is used and employed to determine the workability of concrete in a static position the cage is intended to be from the semiplastic mass of concrete at right angles to the horizontal plane of the mass.

Figure 5:
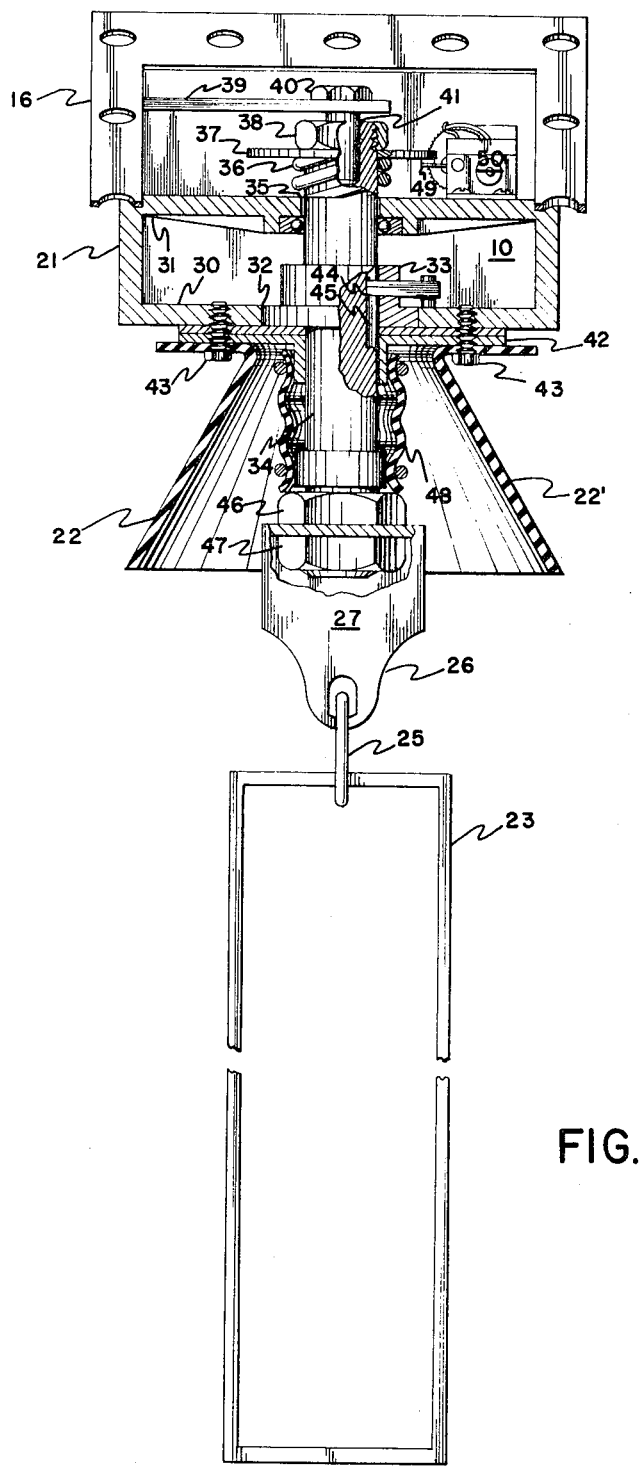
FIG. 5 is a cross-sectional elevational view of the slump indicator assembly of this invention with the closure plate removed taken substantially along the lines 5—5 of the FIG. 3.

Referring now to the cross-sectional elevational view of FIG. 5 of the slump indicator assembly 10 removed from the access cover 11 and having the housing plate 13 removed to more clearly illustrates the assembly 10. The housing 21 including the mounting frame 16 comprises a bottom wall 30 and an intermediate wall 31 bounded by sidewall members. The bottom wall 30 is provided with a hole 32 operable to receive a bushing 33. A shaft 34 of the tension shaft assembly 27 is slidably carried by the bushing 33 in the hole 32 and extends through a hole 35 provided in the intermediate wall 31. The shaft 34 is held perpendicularly in the hole 35 by a spring 36 disposed between a washer member 37 and a locking nut 38 threadably carried by the terminal end of the shaft 34 and the intermediate wall 31. An arm 39 suitably fastened to one of the sidewall members of the housing 21 carries a pin 40 which extends through the arm 39 and into a hole 41 provided in the uppermost terminal end of the shaft 34 operable to vertically align the shaft. The bushing 33 is held in the bottom wall 30 by a mounting plate assembly 42. The mounting plate assembly 42 is suitably fastened to the bottom wall 30 such as by screws 43. The shaft 34 is prevented from rotating in the bushing 33 and the hole 35 by a pin 44 mounted in the bottom wall 30 which extends into a slot 45 provided in the shaft 34. The opposite terminal end of the shaft 34 lowermost with respect to the housing 21 is provided with a pair of locking nuts 46 and 47 threadably mounted on the shaft 34. The yoke 27 is mounted between the locking nuts 46 and 47 and carried by the shaft 34. A flexible boot 48 is provided about the shaft 34 to seal the semiplastic concrete material from the housing 21. The flexible flaplike guards 22 and 22' tend to cause the semiplastic concrete to be deflected from the shaft assembly 27 as the mixing drum of the transit mixer is caused to revolve.

The washer 37 disposed above the spring 36 at the opposite upper most terminal end of the shaft 34 in the housing 21 extends over a pressure arm 49 of a strain gauge assembly 50. The weight of concrete in the sample cage 23 causes the shaft assembly 27 including the washer 37 to be slidably moved downwardly on the spring 36 and the pressure arm 49.

The plan view of the FIG. 6 and the side elevational view of FIG. 7 shows to advantage the strain gauge assembly 50 in a larger scale. The assembly 50 is suitably mounted on intermediate wall 31 of the housing 21. The strain gauge assembly 50 comprises an indicator assembly 52 rotatably mounted on a shaft 53 having one of its terminal ends journaled for rotation in the frame 51 and its opposite terminal end carried by a bracket 54 suitably fastened to the frame 51, a counterdrive assembly 55 rotatably mounted on a shaft 56 journaled for rotation at one of its terminal ends in the bracket 54 and at its opposite terminal end in a bracket 57 mounted on the frame 51, and a strain gauge locking assembly 58 mounted on the shaft 53 of the indicator assembly 52. The pressure arm 49 is mounted on the shaft 53 and is operable to turn the shaft 53 and consequently the indicator assembly 52 in response to the downward movement of the tension post assembly 27 including the shaft 34 carrying the sample cage 23. A gear 59 is mounted on the shaft 53 adjacent the pressure arm 49. A gear 60 mounted at one of the terminal ends of the shaft 56 engages the gear 59. A spring 61 having one of its terminal ends suitably fastened to a block 68 carried on the shaft 56 and its opposite terminal end suitably fastened to the frame 51 is operable to cause rotation of the shaft 56 and gear 60 to drive the gear 59 to its normal at rest position when downward pressure of the washer 37 of the tension assembly 27 is released from the pressure arm 49. That is to say that the counterdrive 55 including the gear 60, the shaft 56, the spring 61, and the block 68 are operable to stabilize the indicator assembly 52 to its normal at rest position.

FIG. 8 shows the strain gauge locking assembly 58 in an unlocked position as obtains when the strain gauge assembly 50 is in an upright position substantially as shown in the FIG. 7. The strain gauge locking assembly comprises a gear 62 mounted on the shaft 53, a balance arm 63 including a substantially L-shaped pawl 65 pivotally mounted on the frame 51, and a balance arm 66 including a substantially L-shaped pawl 67, the pawls 65 and 67 being operable to engage teeth in the gear 62. As the mixing drum of the transit mixer rotates on its axes carrying with it the slump indicator assembly 10 of this invention including the strain gauge assembly 50 the gear 62 of the strain gauge locking assembly 58 and the shaft 53 carrying the indicator assembly 52 is locked in position by one or both of the pawls 65 and 67 until the strain gauge assembly 50 is in its vertical, upright position substantially as shown in the FIG. 7. As the assembly 50 is moved out of a vertical upright position one of the arms such as the balance arm 63 or the pendulum arm 66 is caused to be pivotally moved outward on its respective axes by reason of the weight of the respective arms until the assembly 50 is inverted at which time both of the respective arms 63 and 66 are pivotally moved outwardly substantially as shown in the FIGS. 9 and 10. Each of the arms 63 and 66 carry with them the respective pawls 65 and 67 which engage the gear 62 to lock and hold the shaft 53.

Referring now to the FIG. 11 which advantageously shows the indicator assembly 52, the assembly 52 comprises a spring block 69 mounted on the shaft 53, a cylindrical indicator dial 70 including a sidewall 71 and an adjacent face wall 72, and a coil spring 74 suitably fastened at one of its terminal ends to the spring block 69 on the shaft 53 and the opposite terminal ends suitably fastened to wall 72 of the dial 70. The dial 70 is axially carried by the shaft 53. When the shaft 53 is caused to be rotated in response to movement of the pressure arm 49 the gear 59 on the shaft 53 engaging the fixed gear 60 on the indicator dial 70 causes the dial 70 to be rotated.

In operation the slump indicator assembly 10 is carried by the mixer drum of a transit mixer as it rotates. The screened walls 28 of the sample cage 23 are coincident with the direction of travel of the drum so that the semiplastic concrete in the drum is caused to flow into the cage 23 from the open opposing sides transverse to the direction of travel of the drum. In this manner the sample cage 23 tends to pick up the semiplastic material of the mixed mass in the lower portion of the drum rather than material carried about the drum in the process of being mixed. Hence a more accurate sample of the mass is obtained. As the mixer drum rotates the sample cage 23 is caused to strike either of the rapper bars 18 or 19 to dislodge semiplastic material from the cage 23. When the slump indicator assembly 10 in the mixing drum is at the uppermost portion of the drum the respective pawls 65 and 67 of the arms 63 and 66 disengage the gear 62 of the strain gauge locking assembly 58 to permit rotation of the shaft 53. The shaft 53 is caused to rotate in response to the downward movement of the pressure arm 49, carrying with it the block 59 and the indicator dial 70, causing the dial 70 to rotate. As the mixer drum is caused to rotate beyond the point where the slump indicator assembly 10 is at the uppermost position of the drum, the respective pawls 65 and 67 or either of them is caused to engage the gear 62 and thereby lock the shaft 53 into position. Therefore, the indicator dial 70 is caused to remain at the position at which it was turned at the time the mass of semiplastic material in the cage 23 caused the downward movement on the pressure arm 49 on the shaft 53. Hence, indicia on the indicator dial 70 may be read at any position as the drum rotates except at its uppermost point when the sample is tested.

The method of determining slump and workability of semiplastic material taught by this invention includes the steps of attaching a container having two opposing vertical upstanding open sides to a commonly known strain gauge, correlating indicia on the gauge with the slump of similar material, emersing the container in a semiplastic concrete material mass, withdrawing the container vertically upward out of the mass, permitting semiplastic concrete material to stabilize to a point of natural repose of the mass by observation, and reading indicia on gauge. It has been found in practice that flow of semiplastic material such as concrete tends to stabilize to a uniform rate of flow when it assumes a position of repose. That is to say a very viscous material tens to assume a relatively horizontal repose, while a thick mixture is more conical. Therefore, the state of repose of the mass may be observed. After successive tests of material it has been found that determining the slump of a given material by the commonly known cone and rodding method may be correlated with the weight of the same material at the time it is observed to reach its position of natural repose.

Having thus described in detail a preferred apparatus which embodies the concepts and principles of the invention and which accomplishes the various objects, purposes and aims thereof, it is to be appreciated and will be apparent to those skilled in the art, that many physical changes could be made in the apparatus without altering the inventive concepts and principles embodied therein. Hence, it is intended that the scope of the invention be limited only to the extent indicated in the appended claims.

I claim:

1. In an apparatus for determining slump of semiplastic material the combination of a boxlike housing, an upstanding shaft slidably carried in said housing, said upstanding shaft including a retaining means suitably fastened to one of the terminal ends of said upstanding shaft in said housing and a compressible spring means on said upstanding shaft disposed between said retaining means and a wall of said housing horizontally disposed with respect to said upstanding shaft, an indicator means mounted to one of the walls in said housing, said indicator means including a rotatably indicator shaft, an indicator suitably fastened to said rotatable indicator shaft being operable to rotate with said shaft, a pressure arm mounted on said shaft engageable with said retaining means on said upstanding shaft slidably carried in said housing, said pressure arm means being operable to cause rotation of said rotatable indicator shaft and said indicator in response to movement of said upstanding shaft and said retaining means, indicia on said indicator being correlated with the known slump of comparable semiplastic material as determined from tests made by the commonly known method of rodding said material in a cone and measuring the slump of said material, said upstanding shaft including a yoke suitably fastened to the terminal end of said shaft opposite said retaining means, said yoke being disposed outside of said housing on said upstanding shaft, a sample cage pendently mounted on said yoke, said sample cage having two opposing vertical upstanding open sides, said cage being operable to be emersed into a semiplastic material mass and to retain a portion of said material when withdrawn from said mass.

2. The apparatus of claim 1 including locking means on said rotatable indicator shaft operable to lock said rotatable indicator shaft in position and to prevent rotation of said rotatable indicator shaft.

3. In an apparatus mounted in a commonly known concrete mixer for determining slump of semiplastic material the combination of a boxlike housing including a mounting frame on the uppermost terminal sidewalls of said housing, said frame being upwardly inclined with respect to the bottom wall of said housing, said frame being operable to mount said housing to the sidewall of a substantially cylindrical mixing drum at an angle so that said housing is vertically disposed in said drum respect to the horizontal plane of semiplastic material in said drum when said housing is at the uppermost position is said drum, an upstanding shaft slidably carried in said housing, said upstanding shaft including retaining means suitably fastened to one of the terminal ends of said upstanding shaft in said housing and a compressible spring means on said upstanding shaft disposed between said retaining means and a wall of said housing horizontally disposed with respect to said upstanding shaft, an indicator means mounted to one of the walls in said housing, said indicator means including a rotatable indicator shaft, and indicator suitably fastened to said rotatable indicator shaft being operable to rotate with said shaft, a pressure arm means mounted on said shaft engageable with said retaining means on said upstanding shaft slidably carried in said housing, said pressure arm means being operable to cause rotation of said rotatable indicator shaft and said indicator in response to movement of said upstanding shaft and said retaining means, indicia on said indicator being correlated with the known slump of comparable semiplastic material as determined from tests made by said commonly known method of rodding the material in a cone and measuring the slump of the material, means in said housing engageable with said upstanding shaft operable to prevent said upstanding shaft from rotating, said upstanding shaft including a yoke suitably fastened to the terminal end of said shaft opposite said retaining means, said yoke being disposed in said mixing drum outside of said housing, a sample cage pendently mounted on said yoke, said sample cage including a rectangular boxlike housing having two opposing vertical upstanding open sides disposed transversely to the direction of travel of said mixing drum, said cage being operable to be emersed into a semiplastic material mass in said mixing drum as said drum is caused to rotate and to carry a sample of said material out of said mass in response to the further rotation of said drum.

4. The apparatus of claim 3 including means mounted in side housing engageable with said upstanding shaft operable to vertically align said shaft.

5. The apparatus of claim 3 wherein said pressure means is operable to cause rotation of said rotatable shaft in response to downward movement of said upstanding shaft and said retaining means, and including spring means on said rotatable indicator shaft operable to drive said rotatable indicator shaft in a direction opposite with respect to the downward movement of said upstanding shaft.

6. The apparatus of claim 3 including locking means on said rotatable indicator shaft operable to normally lock said rotatable indicator shaft and the unlock said rotatable indicator shaft when said housing is at the uppermost position of said mixing drum, said rotatable indicator shaft being operable to rotate in response to movement of said upstanding shaft.

7. The apparatus of claim 6 wherein a locking gear is suitably fastened to said rotatable indicator shaft, a pair of opposing weighted portions each including a respective pawl engageable with said locking gear are pivotally mounted to said housing on each side of said shaft, said weight portion being operable to pivotally move in response to rotation of said mixing drum and the cause respective pawls to locking engage said locking gear to lock said rotatable indicator shaft.

* * * * *